United States Patent
Bowie

(10) Patent No.: US 10,001,220 B2
(45) Date of Patent: Jun. 19, 2018

(54) PIPELINE ISOLATION CHECK PLUG

(71) Applicant: STATS (UK) Limited, Aberdeen (GB)

(72) Inventor: Angus George Bowie, Aberdeen (GB)

(73) Assignee: Stats (UK) Limited, Aberdeenshire (GB)

( * ) Notice: Subject to any disclaimer, the term of this patent is extended or adjusted under 35 U.S.C. 154(b) by 847 days.

(21) Appl. No.: 13/756,735

(22) Filed: Feb. 1, 2013

(65) Prior Publication Data

US 2013/0192696 A1 Aug. 1, 2013

(30) Foreign Application Priority Data

Feb. 1, 2012 (GB) .................................. 1201750.5

(51) Int. Cl.
*F16L 55/10* (2006.01)
*F16K 15/00* (2006.01)
*F16L 55/128* (2006.01)
*F16L 55/38* (2006.01)

(52) U.S. Cl.
CPC .......... *F16K 15/00* (2013.01); *F16L 55/1283* (2013.01); *F16L 55/38* (2013.01); *Y10T 137/7837* (2015.04)

(58) Field of Classification Search
CPC ........ F16K 15/00; F16L 55/38; F16L 55/1283
USPC ..................................................... 138/89, 94
See application file for complete search history.

(56) References Cited

U.S. PATENT DOCUMENTS

| | | |
|---|---|---|
| 3,835,889 A | 9/1974 | Hyde |
| 4,314,577 A * | 2/1982 | Brister ............................ 137/13 |
| 4,465,104 A | 8/1984 | Wittman et al. |
| 4,852,391 A * | 8/1989 | Ruch et al. ................. 73/40.5 R |
| 4,941,511 A * | 7/1990 | Johansen et al. ............... 138/89 |
| 5,293,905 A | 3/1994 | Friedrich |
| 5,924,454 A * | 7/1999 | Dyck et al. ..................... 138/89 |
| 6,129,118 A | 10/2000 | Friedrich et al. |
| 6,241,424 B1 * | 6/2001 | Bath et al. .................... 405/156 |
| 6,328,072 B1 | 12/2001 | Mahe et al. |
| 7,475,591 B2 * | 1/2009 | Buckley et al. ............... 73/49.5 |
| 2006/0086400 A1 * | 4/2006 | Beebe et al. .................... 138/90 |
| 2007/0023096 A1 | 2/2007 | Buckley et al. |
| 2007/0284011 A1 * | 12/2007 | Freyer et al. ................... 138/90 |
| 2008/0017390 A1 * | 1/2008 | Bowie .......................... 166/387 |
| 2009/0229373 A1 * | 9/2009 | Bowie ............................ 73/837 |
| 2010/0313985 A1 * | 12/2010 | Bowie ............................ 138/89 |
| 2011/0100644 A1 * | 5/2011 | Bowie et al. ................. 166/374 |
| 2011/0126933 A1 * | 6/2011 | Bowie ............................ 138/90 |

FOREIGN PATENT DOCUMENTS

| | | |
|---|---|---|
| GB | 2470954 | 12/2010 |
| GB | 2474964 | 5/2011 |
| WO | 94/04864 A1 | 3/1994 |

OTHER PUBLICATIONS

United Kingdom Search Report for Application No. GB1201750.5 dated May 25, 2012.
European Search Report for EP Application No. 13153743.3 dated Jan. 29, 2015.

* cited by examiner

*Primary Examiner* — Vishal Pancholi
(74) *Attorney, Agent, or Firm* — Carlson, Gaskey & Olds P.C.

(57) ABSTRACT

An isolation plug for location in a section of pipe has three separate plug modules: a tug module an isolation module and a drag module. In use, the plug can be transported along the pipe and activated by a fluid pressure differential in the pipe.

17 Claims, 2 Drawing Sheets

PIPELINE ISOLATION CHECK PLUG

REFERENCE TO RELATED APPLICATIONS

The application claims priority to United Kingdom Application No. 1201750.5 which was filed on Feb. 1, 2012.

FIELD OF THE INVENTION

This invention relates to pipeline isolation and more particularly, but not exclusively, to a check plug apparatus and method for isolating a pipeline in the event of a breach.

BACKGROUND TO THE INVENTION

Pipeline isolation is used in a variety of industries where, for example, it is required to perform an operation on a section of pipe or to isolate a section of pipe in the event of a breach. In subsea environments, isolation of the pipe may be needed to prevent ingress of water into the pipe or loss of pressurized fluid, such as oil or gas, from the pipe.

Typically, isolation of a pipe may be achieved using an isolation plug and a range of high pressure, hydraulically activated, isolation plugs have been developed which, once set, retain the integrity of the isolation independently of the hydraulic activation system.

In some instances, the isolation plug may be controlled via a hydraulic umbilical. In other instances, the isolation plug may be controlled remotely, with instructions being transmitted to a remote control module via a through pipe wall communication system.

While isolation plugs such as those described above may be used effectively, the requirement for external control of the plug adds complexity and requires external interfaces to be provided on the pipe, such that it may not be practical or feasible to use existing plugs in a number of applications, for example in pipelines which travel across remote or inaccessible terrain, or in subsea applications.

In the field of subsea pipe laying, for example, high pressure isolation plugs may be required to set rapidly in the case of a pipe breach to prevent ingress of seawater. While existing remote controlled plugs may be provided with sensors which activate the plug when water ingress is detected, these plugs also suffer from drawbacks in that they are complex, have multiple failure modes, limited set cycles and still require external access to the pipe at the set location to unset the plug.

SUMMARY OF THE INVENTION

According to a first aspect of the present invention, there is provided an isolation tool for isolating a section of a pipe, the tool including a body, an isolation seal adapted for location on the body and configured to engage a pipe wall, and an activation arrangement for urging the seal into sealing contact with the pipe wall. The activation arrangement is controlled by a fluid pressure differential acting across the tool.

Accordingly, embodiments of the present invention may involve the use of pipeline pressure manipulation to provide isolation, including for example in high pressure isolation applications, without the requirement to provide complex onboard control systems or through pipe wall communication systems.

The tool may define a first, deactivated, configuration in which the seal does not sealingly engage the pipe and a second, activated, configuration in which the seal engages and isolates the pipe.

The tool may be configured to move between the deactivated and activated configurations in response to the pressure differential. In particular embodiments, the tool may be configured to move between the deactivated and activated configurations in response to the direction of the pressure differential. For example, the tool may be configured so when the fluid pressure differential acts in a first, downstream, direction the tool is retained in the deactivated configuration and when the fluid pressure differential acts in a second, upstream, direction, the tool is moved from the deactivated configuration to the activated configuration.

The fluid pressure differential acting across the tool may be actively controlled or selected by an operator. The fluid pressure differential may be actively controlled by manipulating at least one of an upstream fluid pressure (the pressure of fluid upstream of the tool) and a downstream fluid pressure (the pressure of fluid downstream of the tool). In particular embodiments, the fluid pressure differential may be actively controlled by manipulating the upstream fluid pressure. For example, increasing and/or maintaining the upstream fluid pressure above the downstream fluid pressure, the tool may be retained in the deactivated configuration. By reducing the upstream fluid pressure below the downstream fluid pressure or by venting the upstream fluid pressure, the tool may be moved to the activated configuration.

Alternatively, or in addition, the tool may be configured to move between the deactivated and activated conditions automatically in response to a selected fluid pressure differential. For example, in the event of a pipe breach which results in fluid ingress into the pipe, for example ingress of seawater at high pressure, the tool may be configured so that the resulting upstream-directed fluid pressure differential acts to automatically activate the tool and isolate the breach.

The activation arrangement may be of any suitable form and construction.

The tool may be configured so that it is the pressure differential acting across the activation arrangement that moves the tool between the deactivated and activated configurations.

The activation arrangement may include an arrangement for applying a tensile force and a compressive force to the tool in response to the pressure differential, the tensile force retaining the tool in the first, deactivated configuration and the compressive force moving the tool to the activated configuration.

The tensile force may be applied by any suitable means.

In particular embodiments, the activation arrangement may include a tug device capable of movement in the pipe in response to the pressure differential, in particular the direction of the pressure differential. In use, movement of the tug device in response to the pressure differential acting in the downstream direction may apply at least part, and preferably all, of the tensile force required to retain the tool in the deactivated configuration.

In particular embodiments, the tug device may be configured for bi-directional movement in the pipe in response to the pressure differential, that is the tug device may be capable of movement in both the upstream direction and the downstream direction.

In use, movement of the tug device in the upstream direction may apply at least part of the compressive force for moving the tool to the activated configuration when the pressure differential acts in the upstream direction.

In some instances, the tool may provide sufficient resistance to movement in either direction so that the pull or push force applied by the tug device may be sufficient to apply all of the required tensile and compressive forces. However, in preferred embodiments, the activation arrangement may further include a resistive or drag device configured to resist movement of the tool, the tug device and drag device together providing one or both of the required tensile force for retaining the tool in the deactivated configuration and the compressive force for activating the tool.

The tug device and the drag device may be of any suitable form and construction.

The tug device may include any device suitable for applying a push and pull force on the tool in response to the fluid pressure differential.

The tug device may be formed or otherwise configured to obstruct fluid flow through the pipe so as to be urged through the pipe by the fluid pressure differential.

As noted above, in particular embodiments, the tug device may be configured for bi-directional movement in the pipe in response to the direction of the fluid pressure differential.

The tug device may include a seal element for sealingly engaging the pipe wall to obstruct fluid flow. The seal element may be of any suitable form and construction. The seal element may include a bi-directional cup disc. Alternatively, the seal element may include axially spaced flat disc seal elements larger than the pipe bore as used in standard bi-directional pigging.

The tug device may include a single seal element. Alternatively, the tug device may include a plurality of seal elements.

The tool may further include a transport arrangement for urging the tool through the pipe in response to the fluid pressure differential. For example, but not exclusively, the tug device may also be used as, or as part of, the transport arrangement for urging the tool through the pipe. As the tug element is capable of bi-directional movement in the pipe, the tool may be configured so that a sufficient pressure differential will move the tug device along the pipe, that is the tug device may be used to transport or pig the tool along the pipe.

The drag device may be formed or otherwise configured to engage the pipe and, in use, the drag device may provide sufficient resistance to movement in the upstream direction so that the tool moves to the activated configuration before the tool moves or before any significant movement of the tool in the upstream direction. Also, a drag device according to embodiments of the present invention minimizes the pigging pressure required to drive the tool through the pipe while at the same time mitigating wear during pigging operations.

The drag device may include at least one drag element for engaging the pipe wall without sealing against the pipe. The drag element may be of any suitable form and construction. In particular embodiments, one or more drag element may include a wire brush. Alternatively, the drag element may include any suitable braking, high friction, flexible or trailing arm arrangement or combination of these.

One or more drag element may be provided at a trailing angle, that is the drag element may be directed in an upstream direction. The trailing angle may be selected so that the drag device provides greater resistance to movement in the upstream direction to movement in the downstream direction, maximizing the resistance to reverse movement while minimizing drag during pigging.

The drag device may further include one or magnets for increasing drag in those applications where increased drag is desirable.

The isolation seal may be of any suitable form and construction. The isolation seal may include an elastomeric seal. The isolation seal may include a compression seal. In use, application of the compression force may squeeze or otherwise deform the isolation seal so that it moves radially outwards into sealing engagement with the pipe wall.

The tool may further include a lock. The lock may be of any suitable form and construction. In particular embodiments, the lock may include a taper lock having a lock mandrel or bowl and a at least one lock element for engaging the pipe wall.

In use, the compressive force applied to the tool in response to an upstream-directed fluid pressure differential acts to activate the lock and secure the tool within the pipe. At least one, and preferably both, of the isolation seal and the lock may be configured so that further application of force from the upstream directed fluid pressure differential will increase the sealing pressure and/or lock engagement with the pipe.

The tool may further include a piston and cylinder arrangement. In use, the piston and cylinder arrangement may transmit the compressive and tensile forces applied to the tool to the isolation seal and/or the lock. The piston and cylinder arrangement may further act as a restraint which limits the movement between the deactivated and activated configurations and assists in holding the tool together while permitting sufficient movement for the isolation seal and the lock to fully engage the pipe.

The tool may include a single unit. In particular embodiments, the tool may include a plurality of separate modules. Beneficially, the provision of a number of separate modules permits the tool to travel around bends in the pipe. The tool may, for example, include a tug module, an isolation module including the isolation seal and the lock, and a drag module including the drag device. However, it will be recognized that any suitable arrangement may be provided where appropriate.

According to a further aspect of the present invention, there is provided a method of isolating a section of a pipe, the method including the steps of locating a body having an isolation seal mounted thereon in a section of a pipe, and urging the isolation seal into sealing contact with the pipe wall using an activation arrangement controlled by a fluid pressure differential acting across the tool.

It should be understood that the features defined above in accordance with any aspect of the present invention or below in accordance with any specific embodiment may be utilized, either alone or in combination with any other defined feature, in any other aspect of the invention.

BRIEF DESCRIPTION OF THE DRAWINGS

These and other aspects of the present invention will now be described, by way of example only, with reference to the accompanying drawings, in which.

DETAILED DESCRIPTION OF THE DRAWINGS

Figure 1:
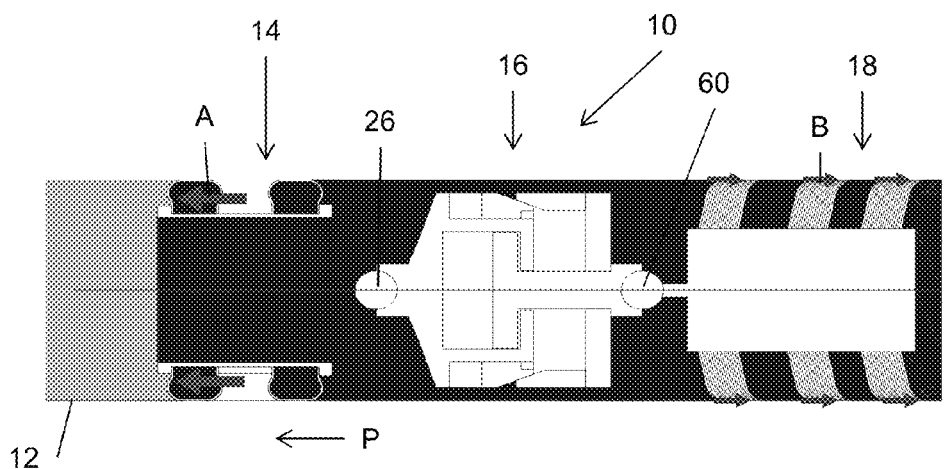
FIG. 1 is a diagrammatic view of an isolation tool according to an embodiment of the present invention, in pigging mode.

Referring first to FIG. 1, there is shown an isolation tool 10 according to an embodiment of the present invention. The isolation plug 10 is shown located in a section of pipe 12 and, in use, the plug 10 can be transported along the pipe 12 and activated to isolate a section of the pipe 12, for example where it is desired to prevent fluid ingress into, or egress from, the pipe in the event of a breach or to carry out an operation in the pipe.

The tool 10 is configured so as to be transported and set by a fluid pressure differential P in the pipe 12. The fluid pressure differential P may be controlled or selected by the operator, in particular by manipulating fluid pressure upstream of the tool 10. Accordingly, the tool 10 is configured to be transported and activated without the requirement to provide complex onboard control systems or through pipe wall communication systems. As an additional benefit, in the event of a pipe breach which results in fluid (for example seawater) ingress into the pipe 12, the tool 10 is configured so that the resulting upstream-directed fluid pressure differential P acts to automatically activate the tool 10 and isolate the breach.

In the embodiment shown, the tool 10 includes three separate plug modules: a tug module 14, an isolation module 16 and a drag module 18. The provision of three separate modules 14, 16, 18 permits the tool 10 to travel around bends in the pipe 12. However, it will be recognized that the tool 10 may alternatively be configured as a single module, or with any number of separate modules as required.

Figure 2:
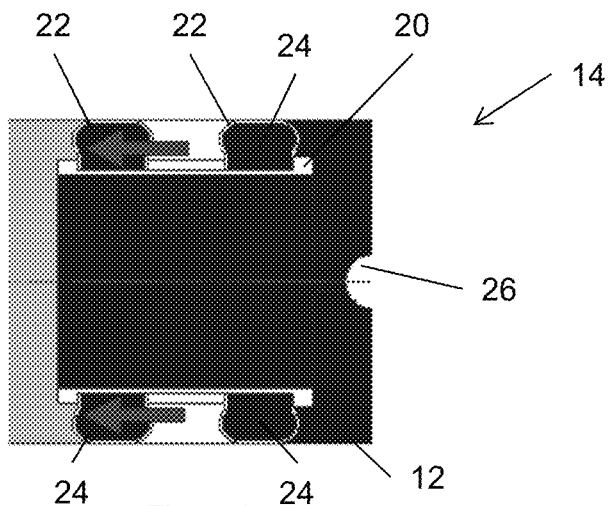
FIG. 2 is an enlarged view of the tug module of the isolation tool.

Referring also to FIG. 2, the tug module 14 is provided at the leading end of the tool 10, and downstream of the isolation module 16. The tug module 14 is bi-directional, that is the module 14 is capable of movement in a first, downstream, direction or a second, upstream, direction in response to the fluid pressure differential P acting across the tug module 14, the direction of travel dependent on the direction of the pressure differential P.

In use, where the fluid pressure differential P acts in a downstream direction (where fluid pressure upstream of the tug module 14 is higher than fluid pressure downstream of the tug module 14) the tug module 14 exerts a pull force on the isolation module 16 and the drag module 18 and urges the tool 10 through the pipe 12 in the downstream direction. The drag module 18 exerts a resistance to movement so as to exert a tensile load on the isolation plug so retaining the deactivated condition. In this way, the tool 10 may be transported or pigged through the pipe 12 to the desired location.

Where the fluid pressure differential P acts in an upstream direction (where fluid pressure upstream of the tug module 14 is lower than fluid pressure downstream of the tug module 14) the tug module 14 exerts a push force on the isolation module 16 and the drag module 18. The drag module 18 is designed to resist this reverse movement with a greater force than it takes to activate the isolation module 16. Thus, the compressive force generated by the downstream pressure differential acts to activate the tool 10 and isolate the pipe 12.

In the embodiment shown, the tug module 14 includes a mandrel 20 around which is mounted one or more bi-directional cup disc seal elements 22 (two axially spaced bi-directional cup disc seal elements 22 are shown in the embodiment of FIG. 1). The tug module 14 is configured so that on insertion into the pipe 12, the seal element or elements 22 obstruct fluid flow through the pipe 12, this obstruction of fluid flow creating the fluid pressure differential P across the module 14 which is utilized to motivate the tug module 14 and the connected isolation module 16 and drag module 18 through the pipe 12. A chamber 24 is defined between each cup disc seal element 22 and the mandrel 20 and the module 14 further includes a valve arrangement (not shown) for providing fluid to inflate the cup disc seal elements 22 into sealing or enhanced sealing contact with the pipe 12. The valve arrangement permits the cup disc seal elements 22 to be inflated by either the upstream fluid or the downstream fluid, whichever of the upstream fluid and downstream fluid is at higher pressure. Thus, the cup disc seal elements 22 may be inflated by the upstream fluid when the tool 10 is to be urged through the pipe 12 or where it is desired to deactivate the tool 10. Alternatively, the cup disc seal elements 22 may be inflated by the downstream fluid where the tool 10 is to be activated.

As an example of the valve arrangement used in the present invention, reference may be made to GB 2,474,964 A, which is incorporated herein in its entirety by way of reference.

Figure 3:
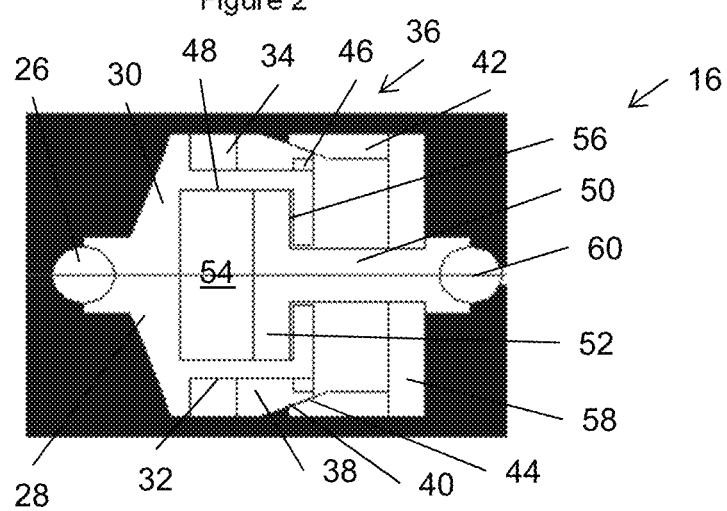
FIG. 3 is an enlarged view of the isolation module of the isolation tool.

Referring also to FIG. 3, the isolation module 16 is provided upstream of the tug module 14 and is coupled to the tug module 14 by a universal joint, such as a ball and socket joint 26. The joint 26 permits the tug module 14 and the isolation module 16 to pivot relative to each other and so allows the tool 10 to travel around bends in the pipe 12.

The isolation plug 16 includes a body 28 defining a pressure head 30. An outer region 32 of the body 28 located upstream of the pressure head 30 is recessed and provides mounting for a seal 34 and a lock 36. In the embodiment shown, the seal 34 includes an annular high pressure compression seal element and the lock 36 includes a taper lock, although other suitable seal and locks may be used where appropriate.

The lock 36 includes a lock mandrel 38 mounted on the body 28, the lock mandrel 38 having a tapered outer surface 40. One or more lock element 42 is positioned around the lock mandrel 38, the or each lock element 42 having a tapered inner surface 44 arranged to cooperate with the tapered outer surface 40 of the mandrel 38. A further element 46 is provided between the recessed region 32 of the body 28 and the lock mandrel 38 to retain the lock mandrel 38 on the body 28 during pigging operations.

The seal 34 is provided between the pressure head 30 and the lock mandrel 38 and, as will be described in more detail below, in use movement of the body 28 compresses the seal 34 which deforms radially outwards into sealing engagement with the pipe 12.

The interior of the body 28 defines a piston and cylinder arrangement having a chamber 48 in which is slidably mounted a piston 50. The downstream end of the piston 50 has a flange end 52 which is located within the chamber 48 and seals against the inside of the chamber 48 to define a cylinder 54. The piston 50 is retained within the chamber 48 by surface 56 of the body 28.

A compression flange or plate 58 is provided on the piston 50 adjacent its distal, upstream end.

In use, movement of the pressure head 30 relative to the compression plate 58 activates the tool 10. As the lock element or elements 42 are axially constrained between the lock mandrel 38 and the compression plate 58, movement of the body 28/lock mandrel 38 in an upstream direction forces the tapered outer surface 40 of the lock mandrel 38 against the tapered inner surface(s) 44 to urge the lock element(s) 42 radially outwards into engagement with the pipe 12 to secure the tool 10 in the pipe 12.

Figure 4:
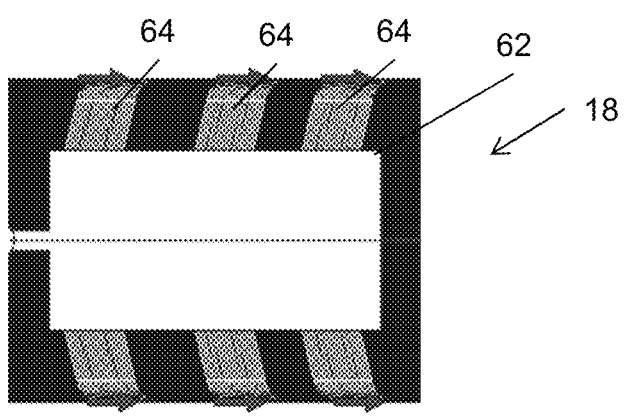
FIG. 4 is an enlarged view of the drag module of the isolation tool.

Referring also to FIG. 4, the drag module 18 is provided upstream of the isolation module 16 and is coupled to the piston 50 of isolation module 16 by a universal joint, such as a ball and socket joint 60. As with the joint 26, the joint 60 permits the isolation module 16 and the drag module 18 to pivot relative to each other and so allows the tool 10 to travel around bends in the pipe 12.

The drag module 18 has a body 62 around which is mounted one or more drag element 64 (three elements 64 are shown in the figures). In the embodiment shown, the drag elements 64 include wire brushes which, on insertion of the tool 10 into the pipe 12, engage the pipe 12 while permitting fluid bypass.

In use, the drag module 18 provides drag during pigging operations, which assists in maintaining the tool 10 in the extended position. The drag module 18 also provides sufficient resistance to reverse movement of the tool 10 (movement in the upstream direction) so that the isolation module 16 will fully engage with the pipe 12 before the tool 10 moves or before any significant movement of the tool 10 in the reverse direction.

As shown, the elements 64 are mounted at a trailing angle, thereby maximizing the resistance to reverse movement while minimizing drag during pigging.

Although the drag module may include any suitable braking or high friction arrangement, a drag module 18 such as described above having greater resistance to reverse movement than forward movement minimizes the pigging pressure required to drive the tool 10 through the pipe 12 while at the same time mitigates wear during pigging operations.

Figure 5:
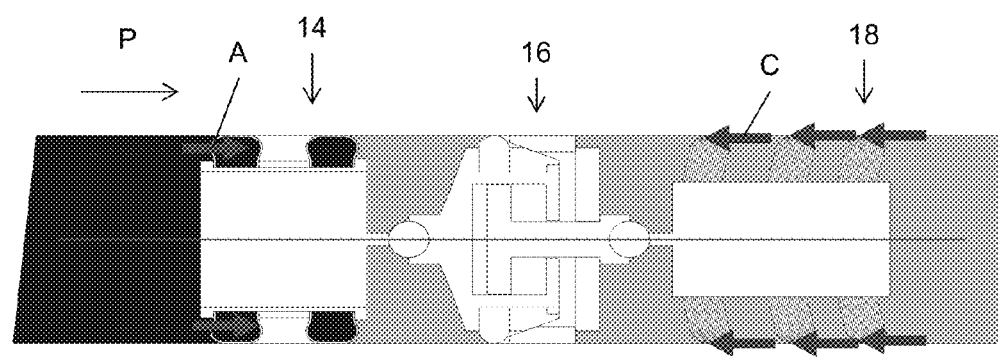
FIG. 5 is a diagrammatic view of the isolation tool shown in FIG. 1, showing the tool being set.
Figure 6:
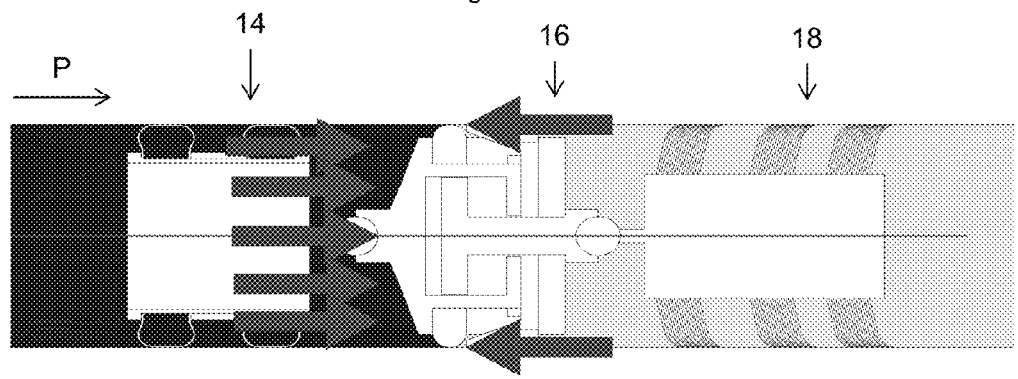
FIG. 6 is a diagrammatic view of the isolation tool shown in FIGS. 1 and 2, isolating a section of pipe.

Operation of the isolation tool 10 will now be described further with reference to all of the figures. FIGS. 1, 5 and 6 are shown together for ease of reference.

FIG. 1 shows the tool in pigging mode. When the upstream pressure is higher than the downstream pressure, the flow will act on the tug module 14 to push the tug module 14 and thereby urge the tool 10 along the pipe.

As the tug module 14 is coupled to the pressure head 28 of the isolation module 16 and the compression plate 58 is coupled to the drag module 18, the pressure head 28 will move first while the compression plate 58, restrained by the drag module 18, only starts to move once the isolation module 16 is fully extended with the piston flange end 52 retained against body back surface 56.

In its extended position, the isolation module 16 is in the deactivated configuration. Thus, the compression seal 34 is allowed to fully relax into its annular space between the pressure head 28 and the lock mandrel 38. The lock elements 42 are located at the narrowest section of the tapered outer surface 40.

As shown in FIG. 1, the arrows A show the fluid force acting on the tug module 14 to urge the tool 10 along the pipe 12 while the arrows B show the drag force acting on the drag module 18. As can be seen, in pigging mode the arrows A and B are directed away from each other, so acting to maintain the tool 10 in the deactivated configuration.

When the tool reaches the desired location in the pipe 12, the upstream pressure is vented so that the upstream pressure is less than the downstream pressure. The bi-directional tug module 14 thus starts to move in an upstream direction. The drag module 18, via the contact between the wire brushes 64 and the pipe 12, resists this initial movement, this resulting in the pressure head 28 moving towards the compression plate 58. This contraction in the length of the isolation module 16 initially activates the lock 36 by pushing the lock elements 42 up the tapered outer surface 40 of lock mandrel 38 to grip the pipe 12. Once in contact with the pipe 12, the lock 36 will prevent reverse movement of the tool 10 with a wedge action which increases grip with the rise in axial load from the increased differential pressure P. At this stage, the drag module 18 becomes redundant.

Further venting of the upstream pressure will generate an axial compression load on the compression seal 34 which acts to squash the seal, expanding it radially outwards to seal against the pipe 12. Once the compression seal 34 generates a seal against the pipe wall, it takes over as the primary seal mechanism. The compression seal 34 and lock 36 configuration can accommodate very high pressures, much higher than the seals provided by the cup disc seal elements 22 of the tug module 14 and so provides a high pressure pipe isolation.

The above describes the situation where the tool 10 is pigged/transported through the pipe 12 and set by manipulation of the pipeline pressure, in particular by controlling the upstream pressure.

In the event that a breach occurs in the pipe 12 which results in the ingress of high pressure fluid, for example high pressure seawater at depth, due to the fact that the downstream pressure exceeds the upstream pressure, the tool 10 will automatically set, thus isolating the upstream section of the pipe 12 from the breach.

As shown in FIG. 2, the arrows A show that the fluid force acting on the tug module 14 now urges the module 14 in an upstream direction. The arrows C show the force resisting reverse movement of the tool 10, the force represented by the arrows C being greater than the drag force represented by the arrows B in FIG. 1. As can be seen, during setting of the tool 10, the arrows A and C are directed towards each other, so acting to compress the isolation module 14 and set/activate the tool 10 to isolate the pipe 12.

Referring to FIG. 3, once set the tool 10 provides high pressure isolation, permitting the isolated section of the pipe (to the right of the isolation module 16) to be vented to ambient pressure, for example facilitating an operation to be carried out on the pipe 12.

When it is desire to deactivate the tool 10, for example after an operation has been carried out, the upstream pressure may be increased. As the upstream pressure equalizes to the downstream pressure, the compression seal 34 relaxes back to the deactivated state on the body 28. This allows the upstream pressure to act on the tug module 14. By increasing the upstream pressure above the downstream pressure, the tool 10 will once again be transported through the pipe 12, as described above with reference to FIG. 1.

Accordingly, it will be recognized that a tool according to the present invention provides a mobile check valve which can be pigged and set at any location in the pipe purely by pipeline pressure manipulation.

It should be understood that the embodiment described herein is merely exemplary and that various modifications may be made thereto without departing from the scope of the invention. For example, although a single seal 34 is shown in the Figures and described above, it will be recognized that the tool 10 may be provided with a plurality of seals, for example two axially spaced seals separated by an annulus. Providing more than one seal provides additional redundancy. Also, monitoring the annulus pressure permits the sealing integrity of the tool to be monitored, if desired and in applications where the additional complexity of a communication system for monitoring the annulus pressure is permissible.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

The invention claimed is:

1. An isolation tool for isolating a section of a pipe, the tool comprising:
   a body;
   an isolation seal adapted for location on the body and configured to engage a pipe wall; and
   an activation arrangement for urging the seal into sealing contact with the pipe wall, the activation arrangement controlled by a fluid pressure differential acting across the tool, the activation arrangement comprising a tug device configured for bi-directional movement in the pipe in response to the pressure differential, the tug device applying a tensile force for retaining the tool in a first deactivated configuration when the pressure differential acts on a first direction and a compressive force for moving the tool to a second activated configuration in response to the pressure differential acting in a second direction.

2. The isolation tool of claim 1, wherein the seal does not sealingly engage the pipe in the first deactivated configuration and the seal engages and isolates the pipe in the second activated configuration.

3. The isolation tool of claim 1, wherein the tool is configured to move between the deactivated and activated configurations in response to the fluid pressure differential.

4. The isolation tool of claim 1, wherein the tool is configured to move between the deactivated and activated configurations in response to the direction of the pressure differential.

5. The isolation tool of claim 4, wherein the tool is configured so that the tool is retained in the deactivated configuration when the fluid pressure differential acts in a first, downstream, direction and the tool is moved from the deactivated configuration to the activated configuration when the fluid pressure differential acts in a second, upstream, direction.

6. The isolation tool of claim 1, wherein the fluid pressure differential acting across the tool is actively controlled or selected by an operator.

7. The isolation tool of claim 6, wherein the fluid pressure differential is actively controlled by manipulating at least one of an upstream fluid pressure and a downstream fluid pressure.

8. The isolation tool of claim 1, wherein the tug device comprises a device suitable for applying a push force and a pull force on the tool in response to the fluid pressure differential.

9. The isolation tool of claim 1, wherein the tug device is formed or otherwise configured to obstruct fluid flow through the pipe so as to be urged through the pipe by the fluid pressure differential.

10. The isolation tool of claim 1, wherein the tug device comprises a seal element for sealingly engaging the pipe wall.

11. The isolation tool of claim 10, wherein the seal element comprises a bi-directional cup disc.

12. The isolation tool of claim 1, wherein the tool further comprises a drag device configured to resist movement of the tool.

13. The isolation tool of claim 1, further including a transport arrangement for urging the tool through the pipe in response to the fluid pressure differential.

14. The isolation tool of claim 1, wherein the tug device is used as, or is part of, a transport arrangement.

15. The isolation tool of claim 1, further including a lock.

16. The isolation tool of claim 1, further including a piston and cylinder arrangement.

17. A method of isolating a section of a pipe, the method comprising the steps of:
   locating a body having an isolation seal configured to engage a pipe wall mounted thereon in a section of a pipe, and an activation arrangement for urging the isolation seal into sealing contact with a pipe wall, an activation arrangement controlled by a fluid pressure differential acting across a tool, the activation arrangement comprising a tug device configured for bi-directional movement in the pipe in response to the fluid pressure differential, the tug device applying a tensile force for retaining the tool in a first deactivated configuration when the pressure differential acts on a first direction and a compressive force for moving the tool to a second activated configuration in response to the pressure differential acting in a second direction to stop applying a tensile force and to apply a compressive force.

* * * * *